US010350573B2

(12) United States Patent
Liu et al.

(10) Patent No.: US 10,350,573 B2
(45) Date of Patent: Jul. 16, 2019

(54) RADIATION CURABLE SYSTEM AND METHOD FOR MAKING A RADIATION CURABLE ARTICLE

(71) Applicant: SAINT-GOBAIN PERFORMANCE PLASTICS CORPORATION, Solon, OH (US)

(72) Inventors: Xipeng Liu, Concord, MA (US); Michael J. Tzivanis, Chicopee, MA (US); Jian L. Ding, Glastonbury, CT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/582,032

(22) Filed: Apr. 28, 2017

(65) Prior Publication Data
US 2017/0312729 A1    Nov. 2, 2017

Related U.S. Application Data

(60) Provisional application No. 62/329,410, filed on Apr. 29, 2016.

(51) Int. Cl.
| | |
|---|---|
| C08F 2/48 | (2006.01) |
| C08F 2/50 | (2006.01) |
| C08G 61/04 | (2006.01) |
| B01J 19/12 | (2006.01) |
| C08K 5/5419 | (2006.01) |
| B05D 3/06 | (2006.01) |
| C08G 77/20 | (2006.01) |
| B01J 35/00 | (2006.01) |
| B01D 63/00 | (2006.01) |
| C08F 290/06 | (2006.01) |

(52) U.S. Cl.
CPC ............ *B01J 19/123* (2013.01); *B01D 63/00* (2013.01); *B01J 35/004* (2013.01); *B05D 3/067* (2013.01); *C08F 2/48* (2013.01); *C08F 290/068* (2013.01); *C08G 77/20* (2013.01); *C08K 5/5419* (2013.01)

(58) Field of Classification Search
CPC ........ B01J 19/123; B01J 35/004; B01J 35/04; C08F 2/48; C08F 290/068; B01D 63/00; C08G 77/20; B05D 3/067; C08K 5/5419
USPC ............................................. 522/99, 1; 520/1
See application file for complete search history.

(56) References Cited

U.S. PATENT DOCUMENTS

| | | | |
|---|---|---|---|
| 5,639,413 A | 6/1997 | Crivello | |
| 6,620,569 B2 | 9/2003 | Tsubuko et al. | |
| 7,307,123 B2 | 12/2007 | Johnson et al. | |
| 7,833,577 B2 | 11/2010 | Sheridan et al. | |
| 8,097,689 B2 | 1/2012 | Ahn et al. | |
| 8,198,357 B2* | 6/2012 | Jeram | B29C 67/246 264/236 |
| 8,232,363 B2 | 7/2012 | Hu et al. | |
| 8,334,037 B2 | 12/2012 | Sheridan et al. | |
| 8,673,419 B2 | 3/2014 | Determan et al. | |
| 8,871,861 B2 | 10/2014 | Shoshi et al. | |
| 8,952,118 B2 | 2/2015 | Arkles et al. | |
| 9,205,601 B2* | 12/2015 | DeSimone | G03F 7/0037 |
| 9,216,546 B2 | 12/2015 | Desimone et al. | |
| 9,216,547 B2 | 12/2015 | Elsey | |
| 9,228,117 B2 | 1/2016 | Sherman et al. | |
| 2007/0049716 A1 | 3/2007 | Sayre | |
| 2007/0148409 A1 | 6/2007 | Rios et al. | |
| 2007/0244287 A1 | 10/2007 | Hatanaka et al. | |
| 2008/0027163 A1 | 1/2008 | McNulty et al. | |
| 2008/0221232 A1* | 9/2008 | Ou | C08L 83/04 521/154 |
| 2009/0130449 A1 | 5/2009 | El-Siblani | |
| 2010/0183814 A1* | 7/2010 | Rios | C09D 183/04 427/387 |
| 2010/0310805 A1* | 12/2010 | Ou | B32B 27/08 428/36.91 |
| 2012/0027970 A1* | 2/2012 | Irmer | C08J 5/00 428/35.7 |

(Continued)

FOREIGN PATENT DOCUMENTS

| | | |
|---|---|---|
| AU | 2008343078 B2 | 7/2009 |
| AU | 2013204631 B2 | 5/2013 |

(Continued)

OTHER PUBLICATIONS

International Search Report for PCT/US2016/069436, International Searching Authority, dated Apr. 14, 2017.

(Continued)

*Primary Examiner* — Jessica Whiteley
(74) *Attorney, Agent, or Firm* — Abel Schillinger, LLP; Chi Suk Kim (57) ABSTRACT

A radiation curable system to form a radiation curable article includes a container including a first portion and a second portion, the first portion of the container including an ultraviolet curable silicone composition including an unsaturated, carbon functional group-containing siloxane component, a hydride-containing siloxane component, and a photoactive catalyst; a second portion of the container including a cure inhibitor; and a source of radiation. Further included is a method of forming a radiation curable article includes providing an ultraviolet curable silicone composition in a first portion of a container, wherein the ultraviolet curable silicone composition includes an unsaturated, carbon functional group-containing siloxane component, a hydride-containing siloxane component, and a photoactive catalyst; providing a cure inhibitor in a second portion of the container; and irradiating the silicone composition with a radiation source to form the radiation curable article.

10 Claims, 1 Drawing Sheet

(56) References Cited

U.S. PATENT DOCUMENTS

| | | | |
|---|---|---|---|
| 2012/0070622 A1 | 3/2012 | Stocq | |
| 2012/0245272 A1 | 9/2012 | Dent et al. | |
| 2013/0341671 A1 | 12/2013 | Ona et al. | |
| 2014/0322519 A1 | 10/2014 | Ahn et al. | |
| 2015/0072293 A1* | 3/2015 | DeSimone | B29C 67/007 430/322 |
| 2016/0059484 A1* | 3/2016 | DeSimone | G03F 7/0037 264/401 |
| 2016/0325493 A1* | 11/2016 | DeSimone | B29C 33/3835 |
| 2017/0283655 A1* | 10/2017 | Kenney | B29C 64/106 |

FOREIGN PATENT DOCUMENTS

| | | | |
|---|---|---|---|
| WO | 2009145086 A1 | 12/2009 | |
| WO | WO-2012145449 A1 * | 10/2012 | C12Q 1/686 |
| WO | 2015020692 A1 | 2/2015 | |
| WO | 2015061075 A1 | 4/2015 | |
| WO | 2015080888 A2 | 6/2015 | |
| WO | 2015105762 A1 | 7/2015 | |
| WO | 2015142546 A1 | 9/2015 | |
| WO | 2015164234 A1 | 10/2015 | |
| WO | 2015195909 A1 | 12/2015 | |
| WO | 2015195920 A1 | 12/2015 | |
| WO | 2015195924 A1 | 12/2015 | |
| WO | 2016044547 A1 | 3/2016 | |

OTHER PUBLICATIONS

International Search Report for PCT/US2017/030183, International Searching Authority, dated Jun. 21, 2017.

* cited by examiner

RADIATION CURABLE SYSTEM AND METHOD FOR MAKING A RADIATION CURABLE ARTICLE

CROSS-REFERENCE TO RELATED APPLICATION(S)

This application claims priority under 35 U.S.C. § 119(e) to U.S. Patent Application No. 62/329,410 entitled "RADIATION CURABLE SYSTEM AND METHOD FOR MAKING A RADIATION CURABLE ARTICLE," by Xipeng Liu, Michael J. Tzivanis and Jian L. Ding, filed Apr. 29, 2016, which is assigned to the current assignee hereof and incorporated herein by reference in its entirety.

FIELD OF THE DISCLOSURE

The disclosure, generally, is related to a radiation curable system and method of forming a radiation curable article.

BACKGROUND

Curable silicone compositions are used in a variety of applications that range from the automotive industry to medical devices. Typical commercial formulations of silicone compositions include a multi-component mixture of a vinyl-containing polyorganosiloxane, a hydride-containing polyorganosiloxane, catalyst, and filler. Often, the commercial formulation is a two-part formulation that is mixed together prior to use. Once the commercial formulation is mixed, the silicone composition is subsequently molded or extruded and vulcanized.

In many cases, the silicone composition is used as a film, can be extruded into a profile, or injection molded within a mold cavity. The conventional silicone compositions such as liquid silicone rubber (LSR) or high consistence rubber (HCR) typically have relatively high viscosity. Further, conventional silicone compositions are thermally cured at elevated temperatures. As a result, conventional silicone compositions are not desirable for new technology applications, such as three dimensional printing, where selective curing and speed of manufacturing are desired.

As such, an improved silicone systems and method of forming articles including the improved silicone systems would be desirable.

SUMMARY

In an embodiment, a radiation curable system to form a radiation curable article includes a container including a first portion and a second portion, the first portion of the container including an ultraviolet curable silicone composition including an unsaturated alkenyl-containing siloxane component, a hydride-containing siloxane component, and a photoactive catalyst; a second portion of the container including a cure inhibitor; and a source of radiation.

In another embodiment, a method of forming a radiation curable article includes providing an ultraviolet curable silicone composition in a first portion of a container, wherein the ultraviolet curable silicone composition includes an unsaturated alkenyl-containing siloxane component, a hydride-containing siloxane component, and a photoactive catalyst; providing a cure inhibitor in a second portion of the container; and irradiating the silicone composition with a radiation source to form the radiation curable article.

In yet another embodiment, a radiation curable system to form a radiation curable article includes a container including a first portion and a second portion, the first portion of the container including an ultraviolet curable silicone composition including an unsaturated, carbon functional group-containing siloxane component, a hydride-containing siloxane component, and a photoactive catalyst; a second portion of the container including a cure inhibitor; and a source of radiation.

In yet a further embodiment, a method of forming a radiation curable article includes providing an ultraviolet curable silicone composition in a first portion of a container, wherein the ultraviolet curable silicone composition includes an unsaturated, carbon functional group-containing siloxane component, a hydride-containing siloxane component, and a photoactive catalyst; providing a cure inhibitor in a second portion of the container; and irradiating the silicone composition with a radiation source to form the radiation curable article.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion focuses on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having" or any other variation thereof, are open-ended terms and should be interpreted to mean "including, but not limited to . . . ." These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 25° C. For instance, values for viscosity are at 25° C., unless indicated otherwise.

The disclosure generally relates to a radiation curable system. The radiation curable system includes a container having a first portion, a second portion, and a source of radiation. The first portion of the system includes an ultraviolet curable silicone composition. The ultraviolet curable silicone composition includes any reasonable silicone component that is curable via ultraviolet radiation. In an embodiment, the silicone component includes an unsaturated, carbon functional group-containing siloxane component, a hydride-containing siloxane component, and a photoactive catalyst. In a particular embodiment, the silicone component includes an unsaturated alkenyl-containing siloxane component, a hydride-containing siloxane component, and a photoactive catalyst. "Component" as used herein refers to a monomer, an oligomer, or a polymer. "Silicone oligomer" as used herein refers to a molecular complex that includes a number of silicone monomer units. The ultraviolet curable silicone composition has a desirable viscosity for applications such as 3-dimensional (3D) printing. Further, the inclusion of the photoactive catalyst provides an expedient method of curing the unsaturated, carbon functional group-containing siloxane component and the hydride-containing siloxane component to provide the formation of three dimensional articles of any desired shape. The system further includes the second portion of the container that includes a cure inhibitor.

In an embodiment, the siloxane composition of the first portion includes the unsaturated, carbon functional group-containing siloxane component, such as the unsaturated alkenyl-containing siloxane component, and the hydride-containing siloxane component. In an embodiment, the unsaturated alkenyl-containing siloxane component and the hydride-containing siloxane component are each on a separate molecule, are on the same molecule, or combination thereof. "Molecule" is known by those skilled in the art as an independent chemical moiety, i.e. including a monomer, oligomer, or polymer. For instance, when the unsaturated alkenyl-containing siloxane component and the hydride-containing siloxane component are each on a separate molecule, an at least one alkenyl group and an at least one hydride group are on a different oligomer or polymer. When the unsaturated alkenyl-containing siloxane component and the hydride-containing siloxane component are on the same molecule, an at least one hydride group and an at least one alkenyl group are each present at any reasonable position on the same oligomer. For instance, when the unsaturated alkenyl-containing siloxane component and the hydride-containing siloxane component are on the same molecule, the at least one hydride group and the at least one alkenyl group can be positioned on the backbone of the silicone component or on a pendant group that is chemically bound to the backbone of the silicone component.

The unsaturated alkenyl-containing siloxane component and the hydride-containing siloxane component polymerize to form a polysiloxane when exposed to cure conditions. In an embodiment, the at least one hydride group and the at least one alkenyl group do not crosslink together when present on the same silicone molecule. For instance, the at least one hydride group crosslinks with an at least one alkenyl group of a different molecule. Any number of silicone molecules can crosslink via a hydride-to-alkenyl covalent linkage when exposed to a radiation source. In an embodiment, the unsaturated alkenyl-containing siloxane component has at least one alkenyl group, such as at least two alkenyl groups. In an embodiment, the hydride-containing siloxane component has at least one hydride group, such as at least two hydride groups. In a particular embodiment, the unsaturated alkenyl siloxane component and the hydride-containing siloxane component are present in an alkenyl to hydride ratio of about 1:2 to about 2:1. In a particular embodiment, the unsaturated alkenyl group is present as the only alkenyl group and resides at one end of the siloxane molecule and the hydride group is present as the only hydride group and resides at the other end of the same siloxane molecule. Although the siloxane component having an unsaturated, carbon functional group is primarily described as an alkenyl group, any unsaturated, carbon functional group is envisioned such as an alkenyl group, an alkynyl group, or combination thereof.

In a particular embodiment, the ultraviolet curable silicone composition has a viscosity of less than about 100,000 centipoise prior to cure, such as less than about 50,000 centipoise prior to cure. Advantageously, the ultraviolet curable silicone composition having the viscosity as described is liquid at room temperature (at about 25° C.). In a particular embodiment, the ultraviolet curable silicone composition may include a siloxane component having a number of D repeating units of less than about 500, such as about 4 to about 500, or even about 4 to about 100. "D" units are typically defined as $R_2SiO_{2/2}$, where R is an alkenyl group, an alkynyl group, a hydride group, an alkyl group, an alkoxy group, a phenyl group, a halogenated alkyl group, an ionic group, or any combination thereof, with the proviso that there is at least one siloxane component having a D unit with an alkenyl group and at least one siloxane component having a D unit with a hydride group. In an embodiment, the alkenyl, alkyl, alkynyl, or alkoxy group includes a $C_{1-6}$ hydrocarbon group, such as a methyl, ethyl, or propyl group. In a particular embodiment, the alkenyl group is a vinyl group. In a particular embodiment, the alkyl group is a methyl group. In an embodiment, the halogenated alkyl group is fluorinated. Any ionic group is envisioned and includes, for example, a sulfonate, a carboxylate, a carboxylic acid, the like, or a combination thereof. In an embodiment, the D units are substantially free of an alkenyl group, an alkynyl group, a hydride group, or combination thereof. "Substantially free" as used herein refers to less than about 0.1 mole of the total moles of the silicone oligomer. It will be appreciated that the viscosity of the silicone composition can be within a range between any of the minimum and maximum values noted above. It will be appreciated that the number of D repeating units can be within a range between any of the minimum and maximum values noted above.

In an example, the unsaturated, carbon functional group-containing siloxane component and the hydride-containing siloxane component may further include other units such as $RSiO_{3/2}$ units ("T" units) and $R_3SiO_{1/2}$ ("M" units), wherein R is defined as above. In an embodiment, the M unit is at respective ends of the silicone component. Any number of units is envisioned with the proviso that the silicone oligomer has a viscosity of less than about 100,000 centipoise, such as less than about 50,000 centipoise as discussed, even less than 5000 centipoise.

The silicone composition may, for example, include polyalkylsiloxanes, such as silicone polymers formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS). In a particular embodiment, the polyalkylsiloxane is the hydride-containing and the unsaturated, carbon functional group-containing silicone component within the silicone composition. In an embodiment, the silicone composition is substantially free of a silicone molecule than contains only either a hydride group or an unsaturated, carbon functional group, i.e. does not contain both the hydride group and the unsaturated, carbon functional group on the same molecule. In an alternative embodiment, the silicone composition is substantially free of a silicone molecule than contains both a hydride group and an unsaturated, carbon functional group, i.e. contains both the hydride group and the unsaturated, carbon functional group on the same molecule. "Substantially free" as used herein refers to less than about 0.1 weight % of the total weight of the silicone composition. In an example, the silicone polymer is non-polar and is free of halide functional groups, such as chlorine and fluorine, and of phenyl functional groups. Alternatively, the silicone polymer may include halide functional groups or phenyl functional groups. For example, the silicone polymer may include fluorosilicone or phenylsilicone.

The silicone composition further includes a photoactive catalyst. Typically, the photoactive catalyst is present to initiate the crosslinking process, particularly when exposed to a radiation source. Any reasonable photoactive catalyst that can initiate crosslinking when exposed to a radiation source is envisioned. Typically, the photoactive catalyst is dependent upon the ultraviolet curable silicone composition. In an embodiment, the photoactive catalyst is a hydrosilylation reaction catalyst. As discussed, the catalytic reaction includes the unsaturated, carbon functional group reacted with the hydride-containing group in order to convert the addition-crosslinkable silicone oligomer into an elastomeric state by formation of a network. For instance, the alkenyl group can react with the hydride group to form a covalent bond by an addition polymerization. The photoactive catalyst is present in any reasonable amount, such as an adequate amount to facilitate crosslinking in the presence of a radiation source. In a particular embodiment, the photoactive catalyst is present at an amount greater than about 5 ppm, such about 5 ppm to about 25 ppm, or to about 250 ppm, based on the total weight of the silicone composition.

For instance, an exemplary photoactive catalyst is an organometallic complex compound of a transition metal. In an embodiment, the photoactive catalyst includes platinum, rhodium, ruthenium, the like, or combinations thereof. In a particular embodiment, the photoactive catalyst includes platinum. Further, any reasonable optional catalyst may be used with the photoactive catalyst. In an embodiment, the optional catalyst may or may not initiate crosslinking when exposed to a radiation source. Exemplary optional catalysts may include peroxide, tin, or combinations thereof. Alternatively, the silicone composition further includes a peroxide catalyzed silicone material. In another example, the silicone composition may include a combination of a platinum catalyst and a peroxide catalyst. In an embodiment, the silicone composition is substantially free of any catalyst that does not initiate crosslinking when exposed to a radiation source.

The silicone composition may further include an additive. Any reasonable additive is envisioned. Exemplary additives may include, individually or in combination, a vinyl polymer, a hydride, an adhesion promoter, a filler, an initiator, an inhibitor, a colorant, a pigment, a carrier material, or any combination thereof. In a particular embodiment, the filler is an inorganic filler such as, for example, fumed silica, precipitated silica, or combination thereof. In an embodiment, the total material content of the unsaturated, carbon functional group-containing siloxane component and the hydride-containing siloxane component is present at an amount of at least about 60 weight %, such as at least about 70 weight %, such as at least about 80 weight %, or even at least about 90 weight %, based on the total weight of the ultraviolet curable silicone composition. In an embodiment, the silicone composition is substantially free of any additional vinyl polymer, a hydride, or combination thereof. In some embodiments, the silicone composition consists essentially of the respective silicone oligomer and catalyst as described above. In an embodiment, the silicone composition consists essentially of the silicone oligomer, catalyst, and a filler. As used herein, the phrase "consists essentially of" used in connection with the silicone composition precludes the presence of non-silicone polymers that affect the basic and novel characteristics of the silicone composition, although, commonly used processing agents and additives may be used in the silicone composition.

The silicone composition may further include a conventional, commercially prepared silicone material. The commercially prepared silicone material typically includes components such as the silicone polymer, a catalyst, a filler, and optional additives. Any reasonable filler and additives are envisioned. The photoactive catalyst that is initiated by the radiation source may be added separately or may be included within the commercially prepared formulation.

The radiation curable system includes the second portion of the container that includes a cure inhibitor. The cure inhibitor is any component that prevents the cure of the silicone composition. Any reasonable cure inhibitor is envisioned. In an embodiment, the cure inhibitor includes a nucleophilic agent such as ammonia, a nitrogen-containing gas or liquid, carbon monoxide, an alcohol, an ester, a sulfur-containing gas or liquid, a phosphorus-containing gas or liquid, a peroxide, or combination thereof. Typically, the cure inhibitor may be a liquid or a gas. In an example, the cure inhibitor is a liquid that may be mixed with the ultraviolet curable silicone composition described within the first portion. In an embodiment, there is a higher concentration gradient of the cure inhibitor at an interface of the first portion and the second portion creating a "rich region" where the ultraviolet curable silicone composition does not cure. In a more particular embodiment, the concentration of cure inhibitor decreases as a distance into the first portion from the second portion of the container increases.

In an embodiment, the first portion and the second portion of the container are not physically separated at an interface of the first portion and the second portion of the container. For instance, the portions of the container are defined by the materials contained with the first portion and the second portion. In another embodiment, the first portion and the second portion of the container are physically separated at the interface of the first portion and the second portion of the container. For instance, the first portion and the second portion are physically separated by a membrane, such as a semi-permeable membrane. In a more particular embodiment, the cure inhibitor can permeate through the semi-permeable membrane to the first portion of the container.

As discussed, the siloxane components are cured via a radiation source. During cure, the photoactive catalyst activates the polymerization reaction such that the hydride-containing siloxane component crosslinks with the unsaturated alkenyl-containing siloxane component. However, when there is a rich region of cure inhibitor, the crosslink reaction is inhibited and cure of the hydride-containing siloxane component and the unsaturated alkenyl-containing siloxane component does not occur even when the photoactive catalyst is exposed to the radiation source. "Cure" as used herein refers to at least partial cure, or even substantial cure. "Partial cure" as used herein refers to >50% of final crosslinking density, as determined for instance by rheometer data (50% cure means the material reaches 50% of the maximum torque as measured by ASTM D5289). "Substantial cure" as used herein refers to >90% of final crosslinking density, as determined for instance by rheometer data (50% cure means the material reaches 50% of the maximum torque as measured by ASTM D5289).

The source of radiation energy can include any reasonable radiation energy source envisioned such as actinic radiation. In a particular embodiment, the radiation source is ultraviolet light. Any reasonable wavelength of ultraviolet light is envisioned. In a specific embodiment, the ultraviolet light is at a wavelength of about 10 nanometers to about 500 nanometers. It will be appreciated that the wavelength can be within a range between any of the minimum and maximum values noted above. The method of irradiating the silicone composition will be further discussed below.

In an embodiment, the radiation curable system is advantageous for forming a three dimensional article via a three dimensional printing system. Any three dimensional printing system is envisioned and includes, but is not limited to, stereolithography (SLA), digital light processing (DLP), continuous liquid interface production (CLIP), and paste extrusion.

Figure 1:
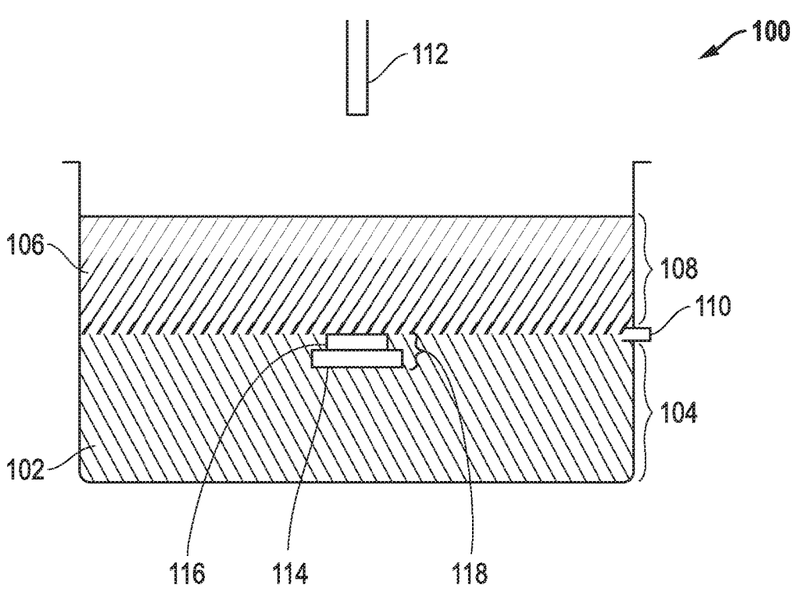
FIG. 1 includes an illustration of a radiation curable system.

In an embodiment, a continuous liquid interface production system is envisioned. As seen in FIG. 1, the container 100 can include the ultraviolet curable silicone composition 102 in a first portion 104 of the container 100. The container 100 can be of any material, and in an embodiment, a section of the container is formed from an ultraviolet transmissive material. The method of forming the radiation curable article includes providing in the first portion 104 of the container the ultraviolet curable silicone composition 102 including the unsaturated, carbon functional group-containing siloxane component, the hydride-containing siloxane component, and the photoactive catalyst. For instance, providing the contents in the first portion 104 includes filling the first portion 104 of the container 100 with the unsaturated alkenyl-containing siloxane component, the hydride-containing siloxane, and the photoactive catalyst. In a particular embodiment, the components of the ultraviolet curable silicone composition 102 are liquid at room temperature. In an alternative embodiment, heat is applied to decrease the viscosity of the ultraviolet curable silicone composition 102 with the proviso that the heat does not activate cure of the silicone composition 102.

The method further includes providing the cure inhibitor 106 in the second portion 108 of the container 100, where there is a higher concentration of cure inhibitor 106 at the interface 110 of the first portion 104 and second portion 108 of the container 100 with a lower concentration of cure inhibitor 106 that permeates into the first portion 104. The method of providing the cure inhibitor 106 depends on the cure inhibitor chosen. For instance, when the cure inhibitor 106 is a liquid, the second portion 108 of the container 100 may be filled with the cure inhibitor 106. As discussed, the second portion 108 may further be filled with the same ultraviolet curable silicone composition (not shown within the second portion 108) that is contained within the first portion 104. In an alternative embodiment, the second portion 108 may further be filled with a different ultraviolet curable silicone composition that is contained within the first portion 104. When the cure inhibitor 106 is a gas, the gas may be provided in conjunction with the use of a semi-permeable membrane (not shown). In an embodiment, the gas flows into the second portion of the container at a sufficient speed and pressure to provide a concentration gradient at the interface 110 of the first portion 104 and the second portion 108 of the container. In an embodiment, the container 100 is free of a semi-permeable membrane.

The ultraviolet curable silicone composition 102 can be selectively irradiated with a radiation source 112 such that a portion 114 of the silicone composition 102 in the first portion 104 of the container 100 is cured. The radiation source 112 can be configured to irradiate a desired thickness and a desired shape from any reasonable direction envisioned. In an example, a portion 114 of the ultraviolet curable silicone composition 102 within the first portion 104 of the container 100 is irradiated and cured to form a shape having a particular dimension. Although illustrated as the radiation source 112, the first portion 104, and the second portion 108 in a configuration as shown, any configuration of the radiation source 112, the first portion 104, and the second portion 108 is envisioned. In an example, the radiation source 112 may be over the container 100 as illustrated or below the container 100. Although not illustrated, the first portion 104 and second portion 108 may be configured where the second portion 108 is at the bottom of the container 100 and the first portion 104 is at the top of the container 100.

The portion 114 that is irradiated and cured may be formed on a carrier surface (not shown). Any carrier surface is envisioned, however, in an exemplary embodiment, a low tack carrier surface is desired. In a more particular embodiment, the ultraviolet curable silicone composition 102 fails to cure at the interface 110 that creates a rich region of the cure inhibitor 106. In an embodiment, the cured portion 114 can then be positioned in any direction envisioned, such as elevated up or down, and a subsequent portion 116 of the silicone composition 102 can be irradiated to build upon the already cured portion 114. The cured portion 114 is directly in contact with and bonds directly to the subsequent portion 116. In an exemplary embodiment, the cured portion 114 directly bonds to the subsequent portion 116 without any intervening layer. This method of positioning the cured portion 114 and irradiating a subsequent portion 116 of the silicone composition 102 to build upon the already cured portion can be repeated any number of times to form a three dimensional radiation cured article 118.

Each cured portion can have any thickness envisioned. In an embodiment, each cured portion can have a thickness between about 0.1 um and about 500 um. Each cured portion may or may not have the same thickness. It will be appreciated that the thickness can be within a range between any of the minimum and maximum values noted above. Further, each cured portion may or may not have the same shape. For instance, each cured portion can have a varying shape to form a three dimensional printed article of varying complexity. In an embodiment, the thickness and shape of the cured portion depends upon the amount of silicone composition irradiated and the amount of cure inhibitor in proximity to the ultraviolet curable silicone composition.

Although illustrated as two cured portions, any number of cured portions is envisioned. For instance, the number of cured portions is dependent upon the final properties and dimensions desired for the radiation curable article. In a particular embodiment, the number of cured portions is provided to form a three dimensional article. The radiation curable article may further include other portions not formed of the silicone composition. Any reasonable method of providing any additional portion is envisioned and is dependent upon the material chosen. An additional portion includes, for example, any non-silicone polymeric portion, a reinforcing portion, a primer portion, a metallic portion, and the like. Any thickness and shape of the additional portion may be envisioned.

The radiation curing provides a continuous process of forming the radiation curable article. In a particular embodiment, the radiation source is sufficient to at least partially cure, or even substantially cure, the silicone composition and provide a three dimensional radiation cured article. In a more particular embodiment, the radiation source provides instant penetration of the radiation into the silicone composition and curing of the silicone composition.

Any reasonable radiation source is envisioned such as actinic radiation. In an embodiment, the radiation source is ultraviolet light (UV). Any reasonable wavelength of ultraviolet light is envisioned. In a specific embodiment, the ultraviolet light is at a wavelength of about 10 nanometers to about 500 nanometers, such as a wavelength of about 200 nanometers to about 400 nanometers. In an embodiment, the system for forming the radiation curable article can include one or more ovens (e.g. infrared (IR) ovens, air ovens), one or more baths (e.g. salt water baths), or a combination thereof, to cure the silicone composition. The one or more IR ovens can operate at a particular peak wavelength. In certain instances, the peak wavelength of a first IR oven can be different from the peak wavelength of a second IR oven. In an embodiment, the silicone composition can be subjected to a heat treatment for a specified period of time. In a particular embodiment, the silicone composition can be subjected to curing in a first IR oven for a first period of time and then subject to curing in a second IR oven for a second period of time that is different from the first period of time. In one particular embodiment, use is made of a short wavelength IR oven. By short wavelength, it is meant that the peak wavelength is below 4 microns, typically below 3 microns, such as within a range of approximately 0.6 to 2.0 microns, such as 0.8 to 1.8 microns. Generally medium and longer wavelength IR ovens are characterized by a peak wavelength on the order of 4 to 8 microns, or even higher. It will be appreciated that the wavelength can be within a range between any of the minimum and maximum values noted above.

The process of forming the radiation cured article may further include thermal treatment of the radiation curable article. Any temperature for thermal treatment is envisioned. In an embodiment, the source of radiation and the thermal treatment may occur concurrently, in sequence, or any combination thereof. In a particular embodiment, the source of radiation and thermal treatment occurs concurrently.

Once formed, the radiation cured article can undergo one or more post processing operations. Any reasonable post processing operations are envisioned. For instance, the radiation cured article can be subjected to a post-cure heat treatment, such as a post-curing cycle. Post thermal treatment typically occurs at a temperature of about 40° C. to about 220° C. In an embodiment, the post thermal treatment is at a temperature of about 60° C. to about 100° C. Typically, the post thermal treatment occurs for a time period of about 5 minutes to about 10 hours, such as about 10 minutes to about 30 minutes, or alternatively about 1 hour to about 4 hours. It will be appreciated that the post thermal treatment temperature and time can be within a range between any of the minimum and maximum values noted above. In an embodiment, the siloxane components are at least partially cured. In a particular embodiment, a post-cure thermal treatment is applied to substantially cure the siloxane components. In an alternative example, the radiation cured article is not subjected to a post thermal treatment. In an example, post processing of the radiation cured article includes shaping, finishing, polishing, trimming, or the like.

Once formed and cured, particular embodiments of the above-disclosed method of forming the radiation curable article advantageously exhibit desired properties such as increased productivity and an improved radiation cured article. In a particular embodiment, the ultraviolet curable silicone composition and radiation cure of the silicone composition can form an article that is not achieved by conventional radiation curable compositions. The radiation source cures the silicone composition to provide a three dimensional article with desirable and in some cases, improved properties compared to a three dimensional printed article formed with a different polymer system. In a particular embodiment, complex three dimensional radiation cured articles may be formed.

Further, particular embodiments of the above-disclosed radiation curable article advantageously exhibit desired properties such as lower extractables and lower volatile organic content than conventional two-part silicone rubber systems that are thermally cured.

The radiation curable article is useful for any industry envisioned. Further, although described primarily as a three dimensional article, it is envisioned that the silicone composition can be used for any article, profile, or film. In an embodiment, the radiation curable article may be envisioned for any reasonable medical or industrial application. Exemplary articles include medical devices, medical tubing, adhesives, sealants, foams, and the like.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1

A radiation curable system to form a radiation curable article, the system including: a container comprising a first portion and a second portion, the first portion of the container including an ultraviolet curable silicone composition including an unsaturated alkenyl-containing siloxane component, a hydride-containing siloxane component, and a photoactive catalyst; a second portion of the container including a cure inhibitor; and a source of radiation.

Embodiment 2

A method of forming a radiation curable article including: providing an ultraviolet curable silicone composition in a first portion of a container, wherein the ultraviolet curable silicone composition includes an unsaturated alkenyl-containing siloxane component, a hydride-containing siloxane component, and a photoactive catalyst; providing a cure inhibitor in a second portion of the container; and irradiating the silicone composition with a radiation source to form the radiation curable article.

Embodiment 3

The radiation curable system or method of forming the radiation curable article of embodiments 1 or 2, further including a semi-permeable membrane between the first portion of the container and the second portion of the container.

Embodiment 4

The radiation curable system or method of forming the radiation curable article of embodiment 3, wherein the cure inhibitor permeates through the semi-permeable membrane to the first portion of the container.

Embodiment 5

The radiation curable system or method of forming the radiation curable article of embodiments 1 or 2, wherein the first portion of the container and the second portion of the container is free of a semi-permeable membrane.

Embodiment 6

The radiation curable system or method of forming the radiation curable article of any of the preceding embodiments, wherein the second portion of the container further includes the ultraviolet curable silicone composition.

Embodiment 7

The radiation curable system or method of forming the radiation curable article of any of the preceding embodiments, wherein the ultraviolet curable silicone composition has a viscosity of less than about 100,000 centipoise prior to cure, such as less than about 50,000 centipoise prior to cure.

Embodiment 8

The radiation curable system or method of forming the radiation curable article of any of the preceding embodiments, wherein the unsaturated alkenyl-containing siloxane component and the hydride-containing siloxane component are present in an alkenyl to hydride ratio of about 1:2 to about 2:1.

Embodiment 9

The radiation curable system or method of forming the radiation curable article of any of the preceding embodiments, wherein the unsaturated alkenyl-containing siloxane component includes at least two alkenyl groups.

Embodiment 10

The radiation curable system or method of forming the radiation curable article of any of the preceding embodiments, wherein the hydride-containing siloxane component includes at least two hydride groups.

Embodiment 11

The radiation curable system or method of forming the radiation curable article of any of the preceding embodiments, wherein the unsaturated alkenyl-containing siloxane component and the hydride-containing siloxane component are on a same molecule.

Embodiment 12

The radiation curable system or method of forming the radiation curable article of embodiments 1-10, wherein the unsaturated alkenyl-containing siloxane component and the hydride-containing siloxane component are on a different molecule.

Embodiment 13

The radiation curable system or method of forming the radiation curable article of any of the preceding embodiments, wherein the cure inhibitor includes a nucleophilic agent.

Embodiment 14

The radiation curable system or method of forming the radiation curable article of embodiment 13, wherein the nucleophilic agent includes ammonia, a nitrogen-containing gas or liquid, carbon monoxide, an alcohol, an ester, a sulfur-containing gas or liquid, a phosphorus-containing gas or liquid, a peroxide, or combination thereof.

Embodiment 15

The radiation curable system or method of forming the radiation curable article of embodiment 14, wherein the nitrogen-containing gas or liquid comprises dimethylformamide (DMF).

Embodiment 16

The radiation curable system or method of forming the radiation curable article of any of the preceding embodiments, wherein the photoactive catalyst is present at an amount greater than about 5 ppm, such as about 5 ppm to about 25 ppm, based on the total weight of the silicone composition.

Embodiment 17

The radiation curable system or method of forming the radiation curable article of any of the preceding embodiments, wherein the photoactive catalyst includes a transition metal.

Embodiment 18

The radiation curable system or method of forming the radiation curable article of embodiment 17, wherein the transition metal includes platinum.

Embodiment 19

The radiation curable system or method of forming the radiation curable article of any of the preceding embodiments, wherein the silicone composition further includes a colorant.

Embodiment 20

The radiation curable system or method of forming the radiation curable article of any of the preceding embodiments, wherein the silicone composition further includes a filler.

Embodiment 21

The radiation curable system or method of forming the radiation curable article of embodiment 20, wherein the filler is an inorganic filler.

Embodiment 22

The radiation curable system or method of forming the radiation curable article of any of the preceding embodiments, wherein the silicone composition includes an ionic group.

Embodiment 23

The radiation curable system or method of forming the radiation curable article of any of the preceding embodiments, wherein the alkenyl group reacts with the hydride group to form a covalent bond by an addition polymerization.

Embodiment 24

The radiation curable system or method of forming the radiation curable article of any of the preceding embodiments, wherein the article is a three dimensional printed radiation cured article.

Embodiment 25

The radiation curable system or method of forming the radiation curable article of any of the preceding embodiments, wherein the silicone composition remains uncured at an interface of the cure inhibitor rich region and the ultraviolet curable silicone composition.

Embodiment 26

The radiation curable system or method of forming the radiation curable article of any of the preceding embodiments, wherein the radiation source partially cures the silicone composition in the first portion of the container to form a three dimensional printed article, and a post-curing process is used to substantially cure the article.

Embodiment 27

The radiation curable system or method of forming the radiation curable article of any of embodiments 1-25, wherein the radiation source substantially cures the silicone composition in the first portion of the container.

Embodiment 28

The radiation curable system or method of forming the radiation curable article of any of the preceding embodiments, wherein the radiation source is ultraviolet energy with a wavelength of about 10 nanometers (nm) to about 500 nm.

Embodiment 29

The method of forming the radiation curable article of embodiment 2, wherein irradiating the silicone composition comprises selectively irradiating at least a portion of the silicone composition to form a three dimensional radiation cured article.

Embodiment 30

A radiation curable system to form a radiation curable article, the system including: a container including a first portion and a second portion, the first portion of the container including an ultraviolet curable silicone composition comprising an unsaturated, carbon functional group-containing siloxane component, a hydride-containing siloxane component, and a photoactive catalyst; a second portion of the container comprising a cure inhibitor; and a source of radiation.

Embodiment 31

A method of forming a radiation curable article including: providing an ultraviolet curable silicone composition in a first portion of a container, wherein the ultraviolet curable silicone composition includes an unsaturated, carbon functional group-containing siloxane component, a hydride-containing siloxane component, and a photoactive catalyst; providing a cure inhibitor in a second portion of the container; and irradiating the silicone composition with a radiation source to form the radiation curable article.

Embodiment 32

The radiation curable system or method of forming the radiation curable article of embodiments 30-31, wherein carbon functional group of the unsaturated, carbon functional group-containing siloxane component includes an alkenyl group, an alkynyl group, or combination thereof.

Embodiment 33

The radiation curable system or method of forming the radiation curable article of embodiments 30-32, further including a semi-permeable membrane between the first portion of the container and the second portion of the container.

Embodiment 34

The radiation curable system or method of forming the radiation curable article of embodiment 33, wherein the cure inhibitor permeates through the semi-permeable membrane to the first portion of the container.

Embodiment 35

The radiation curable system or method of forming the radiation curable article of embodiments 30-32, wherein the first portion of the container and the second portion of the container is free of a semi-permeable membrane.

Embodiment 36

The radiation curable system or method of forming the radiation curable article of any of embodiments 30-35, wherein the second portion of the container further includes the ultraviolet curable silicone composition.

Embodiment 37

The radiation curable system or method of forming the radiation curable article of any of embodiments 30-36, wherein the ultraviolet curable silicone composition has a viscosity of less than about 100,000 centipoise prior to cure, such as less than about 50,000 centipoise prior to cure.

Embodiment 38

The radiation curable system or method of forming the radiation curable article of any of embodiments 30-37, wherein the unsaturated, carbon functional group-containing siloxane component and the hydride-containing siloxane component are present in an unsaturated, carbon functional group to hydride ratio of about 1:2 to about 2:1.

Embodiment 39

The radiation curable system or method of forming the radiation curable article of any of embodiments 30-38, wherein the unsaturated, carbon functional group-containing siloxane component includes at least two unsaturated, carbon functional groups.

Embodiment 40

The radiation curable system or method of forming the radiation curable article of any of embodiments 30-39, wherein the hydride-containing siloxane component includes at least two hydride groups.

Embodiment 41

The radiation curable system or method of forming the radiation curable article of any of embodiments 30-40, wherein the unsaturated, carbon functional group-containing siloxane component and the hydride-containing siloxane component are on a same molecule.

Embodiment 42

The radiation curable system or method of forming the radiation curable article of any of embodiments 30-40, wherein the unsaturated, carbon functional group-containing siloxane component and the hydride-containing siloxane component are on a different molecule.

Embodiment 43

The radiation curable system or method of forming the radiation curable article of any of embodiments 30-42, wherein the cure inhibitor includes a nucleophilic agent.

Embodiment 44

The radiation curable system or method of forming the radiation curable article of embodiment 43, wherein the nucleophilic agent includes ammonia, a nitrogen-containing gas or liquid, carbon monoxide, an alcohol, an ester, a sulfur-containing gas or liquid, a phosphorus-containing gas or liquid, a peroxide, or combination thereof.

Embodiment 45

The radiation curable system or method of forming the radiation curable article of embodiment 44, wherein the nitrogen-containing gas or liquid includes dimethylformamide (DMF).

Embodiment 46

The radiation curable system or method of forming the radiation curable article of any of embodiments 30-45, wherein the photoactive catalyst is present at an amount greater than about 5 ppm, such as about 5 ppm to about 25 ppm, based on the total weight of the silicone composition.

Embodiment 47

The radiation curable system or method of forming the radiation curable article of any of embodiments 30-46, wherein the photoactive catalyst includes a transition metal.

Embodiment 48

The radiation curable system or method of forming the radiation curable article of embodiment 47, wherein the transition metal includes platinum.

Embodiment 49

The radiation curable system or method of forming the radiation curable article of embodiments 30-48, wherein the silicone composition further includes a colorant.

Embodiment 50

The radiation curable system or method of forming the radiation curable article of any of embodiments 30-49, wherein the silicone composition further includes a filler.

Embodiment 51

The radiation curable system or method of forming the radiation curable article of embodiment 50, wherein the filler is an inorganic filler.

Embodiment 52

The radiation curable system or method of forming the radiation curable article of any of embodiments 30-51, wherein the silicone composition includes an ionic group.

Embodiment 53

The radiation curable system or method of forming the radiation curable article of any of embodiments 30-52, wherein the unsaturated, carbon functional group reacts with the hydride group to form a covalent bond by an addition polymerization.

Embodiment 54

The radiation curable system or method of forming the radiation curable article of any of embodiments 30-53, wherein the article is a three dimensional printed radiation cured article.

Embodiment 55

The radiation curable system or method of forming the radiation curable article of any of embodiments 30-54, wherein the silicone composition remains uncured at an interface of the cure inhibitor rich region and the ultraviolet curable silicone composition.

Embodiment 56

The radiation curable system or method of forming the radiation curable article of any of embodiments 30-55, wherein the radiation source partially cures the silicone composition in the first portion of the container to form a three dimensional printed article, and a post-curing process is used to substantially cure the article.

Embodiment 57

The radiation curable system or method of forming the radiation curable article of any of embodiments 30-55, wherein the radiation source substantially cures the silicone composition in the first portion of the container.

Embodiment 58

The radiation curable system or method of forming the radiation curable article of any of embodiments 30-57, wherein the radiation source is ultraviolet energy with a wavelength of about 10 nanometers (nm) to about 500 nm.

Embodiment 59

The method of forming the radiation curable article of embodiment 31, wherein irradiating the silicone composition includes selectively irradiating at least a portion of the silicone composition to form a three dimensional radiation cured article.

The concepts described herein will be further described in the following examples, which do not limit the scope of the disclosure described in the claims. The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

A exemplary ultraviolet curable silicone composition as a control example includes 99 grams of Andisil VS5000 (a commercially available vinyl-terminated dimethylpolysiloxane from AB specialty based in Waukegan, Ill. 60087)[0.06 mmoles/gram vinyl content, 5,000 cSt viscosity)], 1 gram of Andisil XL-10 [Si—H functional polysiloxane crosslinker, 7.55 mmole/gm Si—H content, 45 cSt viscosity), 10 ppm Pt catalyst trimethyl methyl cyclopentadienyl Pt (IV); the mix cures well and formed solid under UV light. The composition cures within 60 seconds with 390 nm 400 Watt UV LED bulb.

The control example plus inhibitor is as follows: 100 gram above mix+1 gram of dimethylformamide (DMF) solvent; this mix did not cure (it still flows) under the same set up for same amount of time. Accordingly, a radiation curable system using two different portions of the control and control plus inhibitor can be used together to selectively irradiate a portion of the ultraviolet curable silicone composition.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation curable system to form a radiation curable article, the system comprising:
  a container comprising a first portion and a second portion, the first portion of the container comprising an ultraviolet curable silicone composition comprising an unsaturated, carbon functional group-containing siloxane component, a hydride-containing siloxane component, and a photoactive catalyst, wherein the ultraviolet curable silicone composition has a viscosity of less than about 100,000 centipoise prior to cure;
  the second portion of the container comprising a cure inhibitor, wherein the cure inhibitor comprises a nucleophilic agent comprising ammonia, a nitrogen-containing gas or liquid, carbon monoxide, an alcohol, a sulfur-containing gas or liquid, a phosphorus-containing gas or liquid, or combination thereof, wherein there is a higher concentration gradient of the cure inhibitor at a cure interface of the first portion and the second portion; and
  a source of radiation.

2. The radiation curable system of claim 1, wherein carbon functional group of the unsaturated, carbon functional group-containing siloxane component comprises an alkenyl group, an alkynyl group, or combination thereof.

3. The radiation curable system of claim 1, further comprising a semi-permeable membrane between the first portion of the container and the second portion of the container.

4. The radiation curable system of claim 1, wherein the first portion of the container and the second portion of the container is free of a semi-permeable membrane.

5. The radiation curable system of claim 1, wherein the second portion of the container further comprises the ultraviolet curable silicone composition.

6. The radiation curable system of claim 1, wherein the unsaturated, carbon functional group-containing siloxane component and the hydride-containing siloxane component are present in an unsaturated, carbon functional group to hydride ratio of about 1:2 to about 2:1.

7. The radiation curable system of claim 1, wherein the unsaturated, carbon functional group-containing siloxane component and the hydride-containing siloxane component are on a same molecule.

8. The radiation curable system of claim 1, wherein the unsaturated, carbon functional group-containing siloxane component and the hydride-containing siloxane component are on a different molecule.

9. The radiation curable system of claim 1, wherein the silicone composition comprises an ionic group.

10. The radiation curable system of claim 1, wherein the article is a three dimensional printed radiation cured article.

* * * * *